United States Patent
Rosen (10) Patent No.: US 7,924,711 B2
(45) Date of Patent: Apr. 12, 2011

(54) METHOD AND APPARATUS TO ADAPTIVELY MANAGE END-TO-END VOICE OVER INTERNET PROTOCOL (VOLP) MEDIA LATENCY

(75) Inventor: Eric C. Rosen, Solana Beach, CA (US)

(73) Assignee: QUALCOMM Incorporated, San Diego, CA (US)

(*) Notice: Subject to any disclaimer, the term of this patent is extended or adjusted under 35 U.S.C. 154(b) by 1159 days.

(21) Appl. No.: 10/969,496

(22) Filed: Oct. 20, 2004

(65) Prior Publication Data
US 2006/0083163 A1 Apr. 20, 2006

(51) Int. Cl.
*H04J 1/16* (2006.01)
*H04J 3/14* (2006.01)
(52) U.S. Cl. .................... 370/230; 370/235; 370/236
(58) Field of Classification Search .......... 370/229, 370/230, 231, 235, 236
See application file for complete search history.

(56) References Cited

U.S. PATENT DOCUMENTS

| | | | | |
|---|---|---|---|---|
| 4,569,042 A * | 2/1986 | Larson | ............... | 370/250 |
| 5,623,483 A | 4/1997 | Agrawal et al. | ............... | 370/253 |
| 6,072,809 A * | 6/2000 | Agrawal et al. | ............... | 370/503 |
| 6,115,357 A * | 9/2000 | Packer et al. | ............... | 370/231 |
| 6,512,761 B1 * | 1/2003 | Schuster et al. | ............... | 370/352 |
| 6,658,027 B1 * | 12/2003 | Kramer et al. | ............... | 370/516 |
| 6,665,728 B1 * | 12/2003 | Graumann et al. | ............... | 709/232 |
| 6,912,224 B1 * | 6/2005 | Duault et al. | ............... | 370/412 |
| 6,917,984 B1 | 7/2005 | Tan | | |
| 6,985,866 B2 * | 1/2006 | Nakagaki | ............... | 704/500 |
| 6,999,921 B2 | 2/2006 | Harris et al. | | |
| 7,113,514 B2 * | 9/2006 | Tahernezhaadi et al. | ..... | 370/401 |
| 7,246,057 B1 * | 7/2007 | Sundqvist et al. | ............ | 704/219 |
| 2003/0012136 A1 * | 1/2003 | Walles | ............ | 370/229 |
| 2003/0036361 A1 | 2/2003 | Kawai et al. | | |
| 2003/0115045 A1 * | 6/2003 | Harris et al. | ............... | 704/214 |
| 2004/0258047 A1 * | 12/2004 | Miao | ............... | 370/352 |
| 2005/0198681 A1 * | 9/2005 | Park | ............... | 725/89 |
| 2006/0251130 A1 * | 11/2006 | Greer et al. | ............... | 370/508 |
| 2006/0259849 A1 * | 11/2006 | Conway | ............... | 714/776 |

(Continued)

FOREIGN PATENT DOCUMENTS

CL 2752-2005 6/2006

(Continued)

OTHER PUBLICATIONS

Steinbach E. et al.: "Adaptive playout for low latency video streaming" Proceedings 2001 International Conference on Image Processing. ICIP 2001. Thessaloniki, Greece, Oct. 7-10, 2001, vol. 1 of 3. Conf. 8, Oct. 7, 2001, pp. 962-965, XP010565021 ISBN: 0-7803-6725-1.

(Continued)

*Primary Examiner* — Chi H Pham
*Assistant Examiner* — Farah Faroul
(74) *Attorney, Agent, or Firm* — Raphael Freiwirth (57) ABSTRACT

A method and apparatus for adaptively managing communication latency, including processing one or more data frames in a communication network; sampling the one or more data frames in accordance with a first sampling time; interpolating the sampled one or more data frames; and forming a play-out waveform using the one or more data frames and having a predetermined length in time. The one or more data frames can be one or more vocoder frames and a play-out time of the one or more vocoder frames is different than the original sampling time.

18 Claims, 4 Drawing Sheets

U.S. PATENT DOCUMENTS

2007/0041324 A1* 2/2007 Shenoi .......................... 370/235

FOREIGN PATENT DOCUMENTS

| EP | 0743773 | 11/1996 |
| JP | 54153503 | 12/1979 |
| JP | 59190757 | 10/1984 |
| JP | 1120928 | 5/1989 |
| JP | 02002757 | 1/1990 |
| JP | 200049807 | 2/2000 |
| JP | 2000209177 | 7/2000 |
| RU | 2158487 | 10/2000 |

OTHER PUBLICATIONS

International Search Report—PCT/US05/037510, International Search Authority—European Patent Office, Mar. 17, 2006.

Written Opinion—PCT/US05/037510, International Search Authority—European Patent Office, Mar. 17, 2006.

International Preliminary Report on Patentability—PCT/US05/037510, The International Bureau of WIPO, Geneva, Switzerland, Apr. 24, 2007.

Liang, Yi J., et al., "Adaptive Playout Scheduling Using Time-Scale Modification in Packet Voice Communications," Packet Voice Communications, Proc. ICASSP 2001, pp. 1445-1448.

Verhelst, et al., "An overlap-add technique based on waveform similarity (WSOLA) for high quality time-scale modification of speech," IEEE ICASSP 1993, vol. 2, Apr. 27-30, 1993, pp. 554-557.

* cited by examiner

METHOD AND APPARATUS TO ADAPTIVELY MANAGE END-TO-END VOICE OVER INTERNET PROTOCOL (VOLP) MEDIA LATENCY

FIELD

The invention generally relates to vocoders, speech processing, telephony, and data communications. More particularly, the present invention relates to a method and apparatus for reducing latency experienced by users in a group communication network and adaptively managing the end-to-end voice over Internet protocol (VoIP) media latency.

DESCRIPTION OF THE RELATED ART

A VoIP phone call is a phone call that is transmitted over a data network, such as the Internet. Internet protocols allow voice call data to be placed or slotted in between other types of data on a data network. Some examples of data networks are a public Internet, a corporate Intranet, an Extranet or other such types of data networks.

There are numerous advantages (e.g cost, performance and call management) associated with making VoIP phone calls as compared to those made over a traditional telephony system. The phone calls are usually significantly cheaper than traditional circuit-switch telephony, because their cost is usually part of the overall expense (often priced as a flat rate regardless of usage) of subscribing to the data network. Additionally, many regulatory agencies presently classify VoIP calls as part of an overall information services package and not voice phone calls, thereby escaping many of the different types of taxes that are associated with traditional telephony.

There are also the benefits associated with managing what would be a separate voice network and separate data network as one, unified network. An Internet phone is basically a networked computer or computing device and therefore it can be managed like a computer, where actions such as moves, changes and upgrades are centrally managed and these actions can also be managed remotely. Finally, a VoIP system can be easily integrated with new or existing data network services. For example, VoIP can support integrated messaging, voice mail, number portability, caller ID, Web access and management and other such features.

Traditional circuit-switch telephony is based on an implicit guarantee or at least a high, probabilistic expectation, that a circuit (whether virtual, physical, wireless or wired) will deliver voice in a predictable, manageable and reliable stream.

The same implicit guarantee and expectation referred to above also remains a valid assumption for digital circuit-switch telephony. Although the voice data is digitized and packetized into discrete chunks of information, typically referred to as vocoder frames, the circuit path that these frames take from a talker to a listener provides a continuous and reliable stream of vocoder frames representing the voice data.

A vocoder is a device used to synthesize speech and convert analog waveforms into digital signals for transmission over a communication network. Vocoders are also used to reduce the bandwidth requirements for transmitting digitized speech signals. They use various techniques to compress voiced speech by extracting and manipulating parameters that are related to models representing human speech generation.

Typically, vocoders are composed of an encoder, which analyzes the incoming speech to extract the relevant parameters, and a decoder, which resynthesizes the speech using relevant parameters which it receives over the transmission channel. Speech is divided into blocks of time or analysis frames, during which the parameters are calculated. The parameters are then updated for each new frame.

VoIP based applications used to mitigate the effects of variable, late, or lost vocoder frame delivery on voice quality have been limited by the capabilities offered by existing interfaces to the vocoder. These existing interfaces have been traditionally designed around the requirements and characteristics of circuit-based channels. Packet-data channels on which VoIP applications are based provide a fundamentally different environment for the datagrams transiting the path between talker and listener. There are algorithms to address these differences, however better strategies are made possible by the availability of new interfaces and capabilities for a vocoder.

Although a circuit path used may not be perfect or optimal, any errors that are introduced into this data stream by the circuit path affect the vocoder frames in a predictable fashion. For any given frame of data that transits across the circuit, one of the following three cases would most likely apply.

1. The frame will transit unmodified after a fixed end-to-end delay; or
2. The frame will transit with one or more bit errors after a fixed end-to-end delay; or
3. The frame will be lost, leaving a gap of information (e.g. in time) before the next vocoder frame in the stream arrives. Note that case (3) above could be viewed as a special case or variation of case (2), where all the bits in the frame potentially are in error after transiting the circuit.

One fundamental characteristic of a communication circuit is that it introduces a fixed end-to-end delay to all frames transiting the circuit, whether the frames are in analog or digital form. As a result, vocoders developed for traditional voice applications are designed to cope with potential errors that may arise in the path taken from talker to listener. Depending upon the type used, some of these vocoders can either:

A. Compensate for bit-errors introduced into frames through error-correction or other coding techniques included in the vocoder frames themselves; or B. Compensate for lost frames by allowing higher layers to signal an erasure condition to the vocoder, resulting in the vocoder interpolating across the time gap using polynomial or other prediction type algorithms specifically supported by the vocoder type that is being used.

These compensation mechanisms for coping with errors in traditional circuit paths have worked well for full-duplex (two way communication) circuit based communications. Generally, voice quality in these applications degrades gracefully as errors are introduced into the circuit.

In a VoIP or VoIP-based telecommunication system, one or more vocoder frames are packaged in IP datagrams and transmitted as discrete chunks of data over a packet network. Clients and servers that communicate via a reliable channel, such as a uniform resource locator (URL) or a socket, have a dedicated point-to-point channel between themselves, or at least the operational illusion of a dedicated channel.

In circuit switched networks, clients and servers communicate by establishing connections, transmitting the data, and then closing the connections. All data sent over the channel is received in the same order in which the data was sent. This data orientation is guaranteed by the channel. In contrast, applications that communicate via datagrams send and receive completely independent packets of information. These clients and servers do not have and do not need a dedicated point-to-point channel. The delivery of datagrams to their destinations is not guaranteed, nor is the order of the arrival of the datagrams at the recipient.

A datagram is an independent, self-contained message sent over a network whose arrival, arrival time, and content are not guaranteed. In a datagram based system, the addition of addressing information to each packet allows the packet-data network to route each datagram independently, on a node-by-node basis, as the datagram traverses the network. This is compared to circuit switch networks which carry data (e.g. the vocoder frames) along a predefined path and consequently have a fixed, predictable latency.

Generally, latency refers to the waiting time or time delay experienced in getting information or data through a network. Latency may originate in many different ways. For example, latency can arise from propagation delay. Propagation delay is the length of time that it takes information to travel a distance from information origination to information termination (e.g over a given telephone line distance). In a packet-based system, there can be transmission delay, where the latency can arise from the length of time it takes to send the packet across the given media. In a telecommunications context, media is most often the conduit or link that carries transmissions. Some examples of transport media include coaxial cable, copper wire, radio waves, waveguide and fiber. Transmission delay is typically determined by the size of the media and the size of the data packet. Another source of latency is processing delay, which is the time required by a network device for performing various tasks, such as route lookup, changing and managing headers, changing the encapsulation of data and other switching tasks In this context, one fundamental difference between a circuit-switch telephony system and a datagram based system is not only that the voice frames of the datagram based system are encapsulated with Internet Protocol (IP) headers, but that they are subject to and exhibit variable link characteristics (e.g. probability of error, congestion) as they traverse a packet-data network.

As a result of these characteristics, vocoder packets in a VoIP application can arrive at the listener with varying end-to-end latencies when compared to other frames, either earlier or later in a sequence of VoIP datagram transmissions. Typical packet networks discard corrupted datagrams, but otherwise they transmit on a best-effort basis. For example, some packets can be lost and never arrive at their ultimate destination. Other packets may arrive too late and not be useful.

One challenge facing VoIP applications and other IP-based media streaming applications as well, such as video telephony applications, is that voice play-out cannot begin until the first media datagram is received by the listener. If this datagram is uncharacteristically delayed (or if the first media datagram transmitted is lost and hence the receiver must wait for subsequent datagrams to successfully transit), a large initial end-to-end latency is initially introduced into the media stream.

Consequently, in many scenarios, VoIP applications need to address the following two issues. They need to contend with packets arriving with variable latencies and with varying inter-arrival times or jitter, including packets that arrive out of sequence. They also need to contend with packets that are lost, or arrive too late to be interesting or useful at the application layer.

One way of dealing with variability in inter-arrival times is to smooth out the received jitter at the receiver by buffering received vocoder frames for a fixed period of time. This buffering approach effectively simulates the fixed end-to-end latency of a circuit path at the expense of delaying play-out for some or all vocoder frames. Various algorithms exist for determining the introduced delay, commonly known as play-out threshold or watermark.

However, if a fixed delay is used, the delay is typically proportional to the maximum expected end-to-end latency for the packet network between the talker and the listener. As a result, this approach tends to significantly increase VoIP end-to-end media latency compared to a circuit path between the same talker and listener.

A fixed delay is often introduced to media play-out to allow vocoder frames delayed by a packet-data network to arrive before their play-out time arrives. The longer the introduced delay, the more likely a given vocoder frame will arrive before its play-out time arrives. However, the longer delays contribute to longer end-to-end media latencies, which in turn detract from the perceived voice quality and the general usability of the application.

There are approaches to compensate for late or lost packets carrying vocoder frames. One approach is to signal an erasure event to the vocoder when the time arrives to play a vocoder frame which has been lost or will arrive late. Another approach is to simply ignore the lost packets and play the next available vocoder frame in place of the lost frame. The latter approach is used when knowledge of lost frame events is not available or known at the layer submitting frames to the vocoder for play-out. This strategy is also used for compressing time or shedding end-to-end media latency that may build up over time in a VoIP stream by using the lost data as an opportunity to catch up with the data trasmission. Relying on the packet-data network to determine which vocoder frames are best to discard may result in significant detrimental impacts to voice quality.

Consequently, choosing a threshold based on long-term performance statistics of a given packet data network tends to delay voice play-out unnecessarily when a specific network or network path is performing better than average or better than the previously obtained statistics. An alternative is to choose a threshold based on the actual or predicted link performance at that particular point in time. For example, a running average of the empirical end-to-end delay can be tabulated and maintained by the receiver, and is some circumstances, used as a threshold to start media play-out.

However, since the quality of the running average is proportional to the number of samples used to determine it, in practice, this average delay can only be used for subsequent talk-spurts (half-duplex) or talk-streams (full-duplex). An approximate estimate can be inferred by limiting the number of frames used to compile the running average. As an extreme, the delay can be inferred by examining the first received packet, although in practice, there are limitations associated with this approach.

If the talker and the listener have coordinated time sources (e.g. communications in a Code Division Multiple Access (CDMA) system), an accurate and precise determination of the end-to-end network latencies between the talker and listener can be determined. If averaged over a large enough sample size, this delay represents the fixed component of the end-to-end network latency and can be subtracted from the watermark used to initiate media play-out. The result is a threshold that only represents the delay required to smooth out the expected jitter.

Therefore, it is desirable to provide a mechanism for adaptively managing end-to-end VoIP media latency and to mitigate the effects of variable, late, or lost vocoder frames delivery on voice quality.

SUMMARY OF THE INVENTION

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

One embodiment is a method for adaptively managing communication latency. This includes monitoring end-to-end media latency in a communication network; measuring a current value of end-to-end media latency; comparing the measured current value of end-to-end latency against a predetermined media latency value; and discarding data if the measured current value of end-to-end latency is greater than the predetermined media latency value. In one aspect, the discarding further includes determining a current depth in frames of a media play-out buffer. In another aspect, the media play-out buffer is located at a receiver location within the communication network. In another aspect, the discarding further comprises evaluating a proportion of targeted frames in a media stream relative to a total number of frames in the media stream.

Another embodiment is a method for adaptively managing communication latency including processing one or more data frames in a communication network; sampling the one or more data frames in accordance with a first sampling time; interpolating the sampled one or more data frames; and forming a play-out waveform using the one or more data frames and wherein the play-out waveform has a predetermined length in time. In one aspect the one or more data frames include one or more vocoder frames and a play-out time of the one or more vocoder frames is different than the first sampling time. In another aspect, the play-out time of the one or more vocoder frames is of a shorter time duration than the first sampling time. In another aspect a pitch-preserving transform is applied to the one or more vocoder frames. In another aspect a frequency-to-time domain transform is applied to the one or more vocoder frames. In another aspect, the pitch-preserving transform compresses the play-out time of the one or more vocoder frames. In another aspect, the pitch-preserving transform expands the play-out time of the one or more vocoder frames. In another aspect, the one or more vocoder frames stored in a queue are stored and monitored. In another aspect, the queue storing the one or more vocoder frames is a play-out queue buffer. Another aspect includes monitoring a plurality of vocoder frames stored in the play-out queue buffer; ascertaining a storage capacity depth of the play-out queue buffer; and determining if the depth of the play-out queue buffer is sufficient to mask an expected jitter in a media stream. In another aspect, if the depth of the play-out queue buffer is determined to be too low to mask the expected jitter in the media stream, a latency is induced into the play-out waveform. In another aspect, the latency is modified by expanding a length of the play-out waveform. In another aspect, the latency is modified by compressing a length of the play-out waveform. Another aspect applies a pitch-preserving transform to the one or more vocoder frames. Another aspect applies a frequency-to-time domain transform to the one or more vocoder frames. Another aspect uses a time-compression algorithm to reduce the latency, if the latency exceeds a predetermined value.

Another embodiment is an apparatus for adaptively managing communication latency including means for monitoring end-to-end media latency in a communication network; means for measuring a current value of end-to-end media latency; means for comparing the measured current value of end-to-end latency against a predetermined media latency value; and means for discarding data if the measured current value of end-to-end latency is greater than the predetermined media latency value. In one aspect, the means for discarding further includes determining a current depth in frames of a media play-out buffer. In another aspect, the media play-out buffer is located at a receiver location within the communication network. In another aspect, the means for discarding further comprises evaluating a proportion of targeted frames in a media stream relative to a total number of frames in the media stream.

Another embodiment is an apparatus for adaptively managing communication latency including means for processing one or more data frames in a communication network; means for sampling the one or more data frames in accordance with a first sampling time; means for interpolating the sampled one or more data frames; and means for forming a play-out waveform using the one or more data frames and wherein the play-out waveform has a predetermined length in time. In one aspect, the one or more data frames include one or more vocoder frames and a play-out time of the one or more vocoder frames is different than the first sampling time. In another aspect, the play-out time of the one or more vocoder frames is of a shorter time duration than the first sampling time. Another aspect includes applying a pitch-preserving transform to the one or more vocoder frames. Another aspect includes applying a frequency-to-time domain transform to the one or more vocoder frames. In another aspect, the pitch-preserving transform compresses the play-out time of the one or more vocoder frames. In another aspect, the pitch-preserving transform expands the play-out time of the one or more vocoder frames. Another aspect stores and monitors the one or more vocoder frames stored in a queue. In another aspect, the queue stores the one or more vocoder frames is a play-out queue buffer. In another aspect there are means for monitoring a plurality of vocoder frames stored in the play-out queue buffer; means for ascertaining a storage capacity depth of the play-out queue buffer; and means for determining if the depth of the play-out queue buffer is sufficient to mask an expected jitter in a media stream. In another aspect, if the depth of the play-out queue buffer is determined to be too low to mask the expected jitter in the media stream, a latency is induced into the play-out waveform. In another aspect, the latency is modified by expanding a length of the play-out waveform. In another aspect, the latency is modified by compressing a length of the play-out waveform. Another aspect applies a pitch-preserving transform to the one or more vocoder frames. Another aspect applies a frequency-to-time domain transform to the one or more vocoder frames. Another aspect uses a time-compression algorithm to reduce the latency, if the latency exceeds a predetermined value.

In another embodiment, a communication device includes a computer-readable medium embodying a method for adaptively managing communication latency including: processing one or more data frames in a communication network; sampling the one or more data frames in accordance with a first sampling time; interpolating the sampled one or more data frames; and forming a play-out waveform using the one or more data frames and wherein the play-out waveform has a predetermined length in time. In one aspect, the one or more data frames include one or more vocoder frames and a play-out time of the one or more vocoder frames is different than the first sampling time. In another aspect, the play-out time of the one or more vocoder frames is of a shorter time duration than the first sampling time. In another aspect, a pitch-preserving transform is applied to the one or more vocoder frames. In another aspect, a frequency-to-time domain transform is applied to the one or more vocoder frames. In another aspect, the pitch-preserving transform compresses the play-out time of the one or more vocoder frames. In another aspect, the pitch-preserving transform expands the play-out time of the one or more vocoder frames. In another aspect, the one or more vocoder frames stored in a queue are stored and monitored. In another aspect, the queue storing the one or more vocoder frames is a play-out queue buffer. Another aspect includes monitoring a plurality of vocoder frames stored in the play-out queue buffer; ascertaining a storage capacity depth of the play-out queue buffer; and determining if the depth of the play-out queue buffer is sufficient to mask an expected jitter in a media stream. In another aspect, if the depth of the play-out queue buffer is determined to be too low to mask the expected jitter in the media stream, a latency is induced into the play-out waveform. In another aspect, the latency is modified by expanding a length of the play-out waveform. In another aspect, the latency is modified by compressing a length of the play-out waveform. In another aspect, a pitch-preserving transform is applied to the one or more vocoder frames. In another aspect, a frequency-to-time domain transform is applied to the one or more vocoder frames. In another aspect, a time-compression algorithm is used to reduce the latency, if the latency exceeds a predetermined value.

BRIEF DESCRIPTION OF THE DRAWINGS

The features and advantages of the present invention will be better understood by reading the following detailed description in conjunction with the drawings in which.

DETAILED DESCRIPTION OF THE INVENTION

The word "exemplary" is used to mean "serving as an example, instance, or illustration." Any embodiment described as "exemplary" is not necessarily to be construed as preferred or advantageous over other embodiments.

Before one embodiment of the invention is explained in detail, it is to be understood that the invention is not limited in its application to the details of the construction and the arrangement of the components set forth in the following description or illustrated in the drawings. The invention is capable of being implemented in other embodiments and carried out in various ways. Also, it is understood that the phraseology and terminology used herein is for purposes of description and understanding and should not be regarded as limiting.

Figure 1:
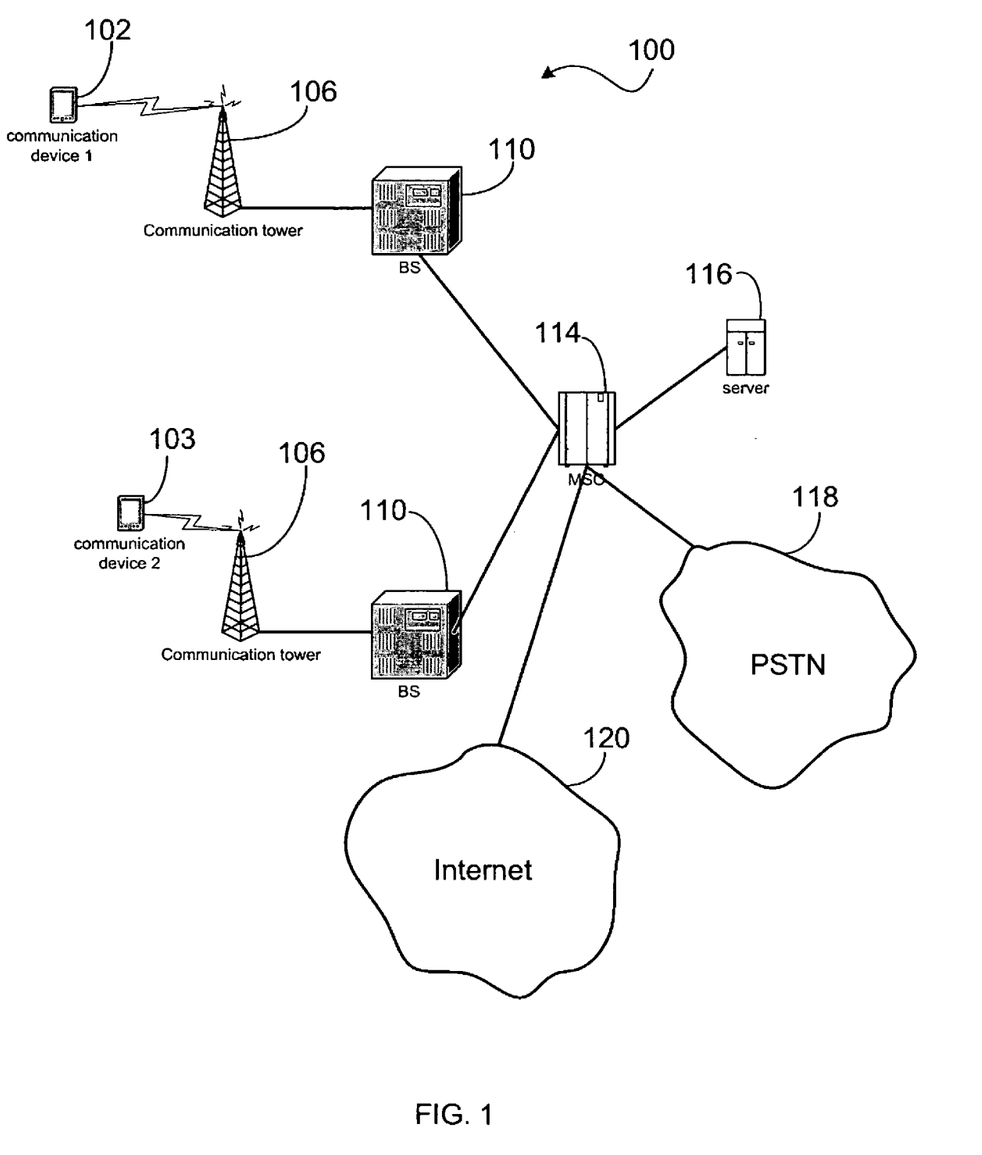
FIG. 1 illustrates an exemplary communication network.

FIG. 1 illustrates an exemplary communication network 100. The communication network 100 includes one or more communication towers 106, each connected to a base station (BS) 110 and serving users with communication devices 102. The communication devices 102 can be cellular telephones, pagers, personal digital assistants (PDAs), laptop computers, or other hand-held, stationary, or portable communication devices that support data communications.

The commands and data input by each user are transmitted as digital data to a communications tower 106. The communication between a user using a communication device 102 and the communication tower 106 can be based on different technologies and protocols. For example, code division multiple access (CDMA), time division multiple access (TDMA), frequency division multiple access (FDMA), the global system for mobile communications (GSM), or other types of communication protocols may be used in a wireless communications network or a data communications network. The data from each user is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. The server includes an application that supports the PTT feature besides storing a table that lists members of each communication group. Optionally, the server 116 may be part of the MSC 114.

Figure 2:
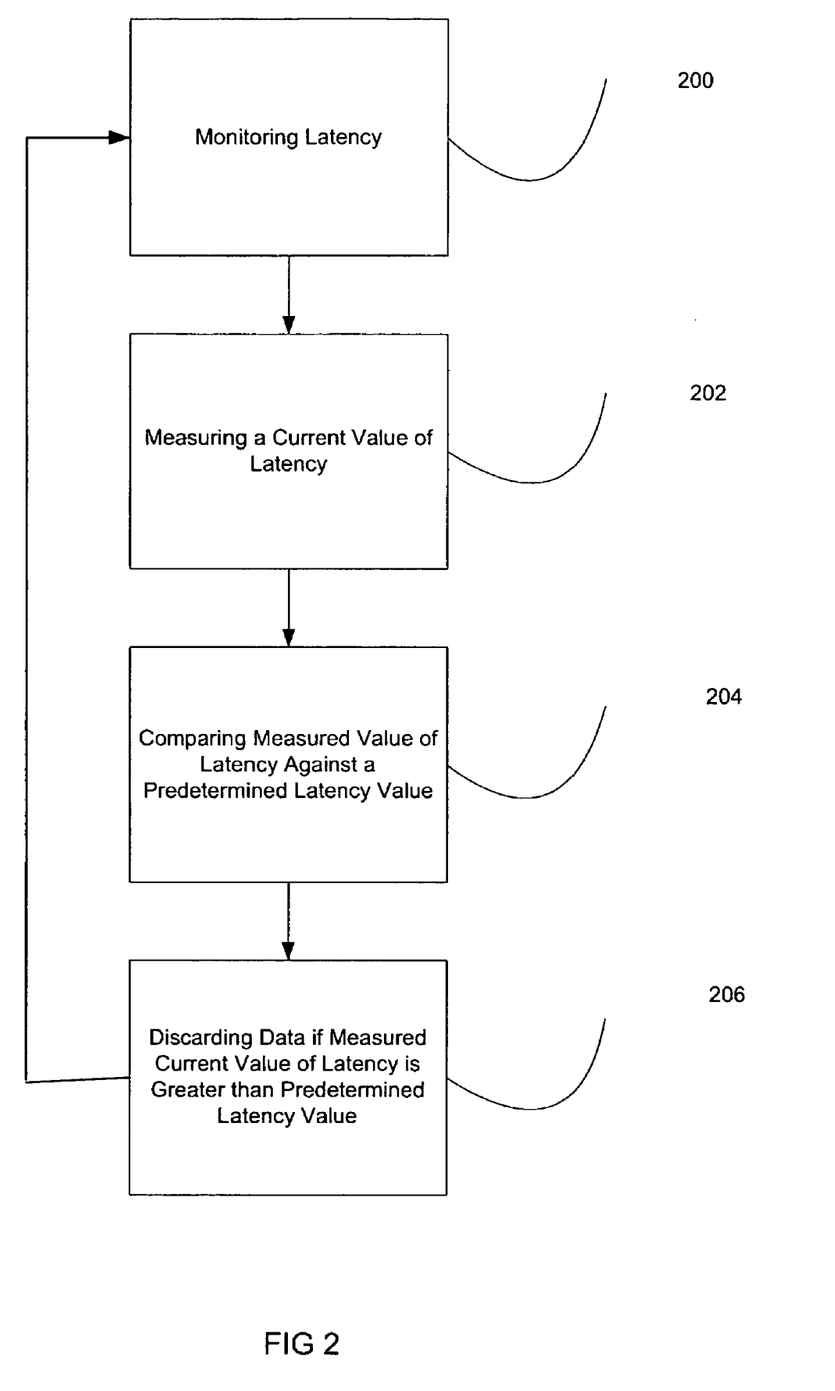
FIG. 2 is a flow chart illustrating operation of adaptively managing communication latency according to one exemplary embodiment.

In the embodiment illustrated in FIG. 2, the latency present in data transmitted through a communication network (such as the exemplary one illustrated in FIG. 1) is observed and monitored 200. With respect to a given piece of data (e.g. packets, data frames, datagrams, vocoder frames or the like), a current value of the latency associated with a specific piece(s) of information is determined 202. The latency can be measured in any incremental or temporal duration that a particular implementation suggests is useful or desired for the given application. After the measured latency value has been determined, the measured latency value is compared against a predetermined latency value 204. In one embodiment, the predetermined latency value represents an acceptable, threshold level of latency that is compared with the measured latency.

If the measured current value of latency 204 is greater than the predetermined latency value, data is discarded 206. The discarding of the data improves the latency of the communication network. Determining the amount of media to be discarded depends upon several factors, such as the communication network involved, the types of media transiting the network and its size, quality level desired (e.g. voice quality) and other such variables and system parameters. The amount of media to be discarded can be based upon the factors discussed above, or the media discarded can also be performed on an iterative basis while searching for an acceptable outcome to an end user. This contributes to the ability of the method to adaptively manage the process, based upon changing communication conditions and operational parameters. Then, upon discarding the media in 206, the method returns to monitoring the latency in 200 and continues in an iterative manner.

One exemplary way for recovering from an initial delay is to discard vocoder frames at the receiver, with each frame typically representing 20 ms of voice. This process of reducing end-to-end media latency by throwing away information is a form of latency shedding. The idea is to throw away information to support acceptable levels of latency, while still retaining enough information to discern the intended communication content. Vocoders that are designed around the 8 kHz sampling assumptions are generally designed to represent 20 ms of speech per frame. This particular value is also standardized by the IETF's Real Time Protocol (RFC 1889). Those skilled in the art will appreciate that different sampling schemes, size of data frames, assumptions and the like may be used, without departing from the spirit and scope of the present invention.

Another approach of managing latency is to discard vocoder frames at the talker (e.g. before transmission). This approach has the added advantage of saving bandwidth, since less data is input for transmission across the communication network. However, this approach is considered impractical for half-duplex VoIP applications which do not utilize a media quality back-channel (i.e. which does not use real time conferencing protocol (RTCP) or a similar protocol to provide feedback regarding media receipt statistics). Those skilled in the art will realize that other data applications, in addition to VoIP applications, can be used without departing from the spirit and scope of the claimed invention.

Choosing which frames to play-out and which frames to discard is one factor to consider, because discarding any information from a highly compressed vocoder stream will result in reduced or impacted voice quality. For some variable rate vocoders employed by CDMA handsets [e.g. Qualcomm Code Excited Linear Prediction (QCELP), Enhanced Variable Rate Coding (EVRC), Selectable Mode Vocoders (SMV) and the like], some vocoder frames contain more critical information than others. For example, it is generally true that the effect on perceived voice quality due to the loss of an eighth-rate (also referred to as rate ⅛) vocoder frame is less than the effect due to the loss of a full-rate (also referred to as rate 1) or half-rate (also referred to as rate ½) vocoder frame. Consequently, the nature and impact of the information discarded and the vocoder used is a consideration in determining what and how much to discard.

Another exemplary form of latency shedding is to periodically discard eighth-rate frames as they are prepared for play-out at the listener. The rate at which frames are identified for discard depend on several factors, including (a) the current end-to-end media latency, (b) the current depth (in frames) of the media play-out buffer at the listener, and (c) the proportion of frames which could be targeted relative to the total number of frames in the media stream.

However, not all eighth-rate frames are equal, and although eighth-rate frames generally code less critical segments of the voice stream in time, simply discarding 20 ms segments can introduce noticeable artifacts in the decoded speech.

An example of this approach is outlined below in pseudo-code form:

```
while (listening_to_media ( ) ) {
    frame = get_next_frame ( ) ;
    /* is current media latency too high? */
    if (current_media_latency ( ) > MAX_MEDIA_LATENCY) {
        /*ignore frame */ ;
    else
        vocoder_play_frame (frame) ;
}
```

Please note that the pseudo-code shown immediately above and any other pseudo-code presented in the specification is provided for purposes of providing a clearer understanding and explanation and are not intended to limit the scope of the invention in any way. Furthermore, note that the exemplary scenario discussed above used an eighth-rate vocoder frame, although an Nth-rate frame can also be used without departing from the scope and spirit of the invention.

One assumption in the pseudo-code discussed above is that this approach assumes only an interface to send single vocoder frames sequentially to the vocoder for play-out: vocoder_play_frame ( )—the minimal interface that a vocoder designed purely for traditional circuit-switch applications would be required to provide.

Another approach to recovering from initial media latency delays in real-time that is less likely to introduce perceptible media artifacts in the output waveform is to use one or more sequential vocoder frames to generate a shorter wave-form than the waveform that was originally used to produce the vocoder frames, using a transform algorithm. Some examples of transform algorithms that may be used to generate a shorter wave-form are pitch-preserving or equivalent frequency-to-time domain transforms and the like.

Figure 3:
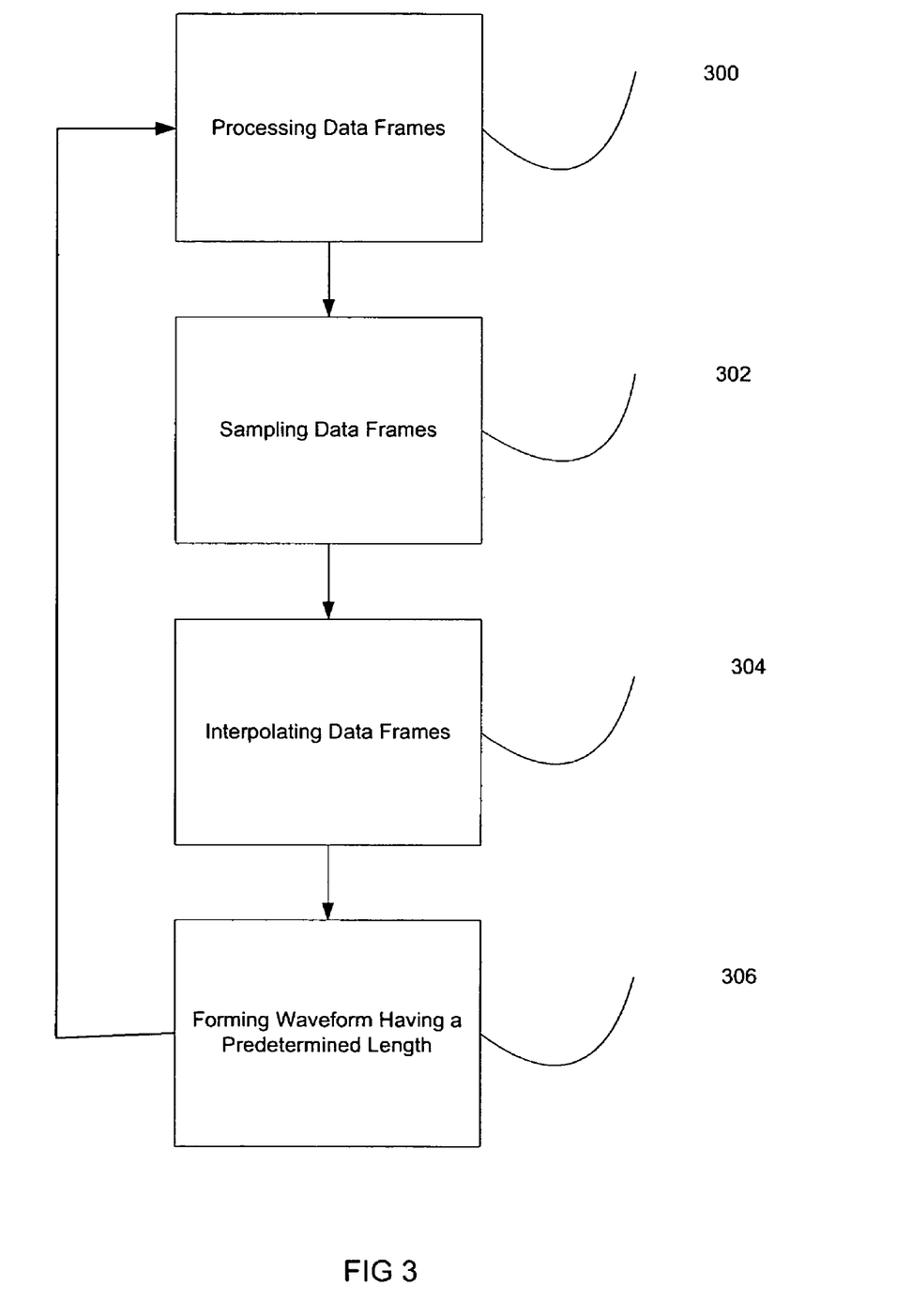
FIG. 3 is a flow chart illustrating operation of data frame interpolation according to one exemplary embodiment.

In the embodiment illustrated in FIG. 3, dataframes are processed 300, such as those dataframes representing one or more sequential vocoder frames. The processing includes determining the data content and type of data contained within a particular dataframe. The dataframes are then sampled 302 and interpolated 304. This allows the dataframes to be examined in accordance with a specific sampling scheme so that desired dataframes are looked at in accordance with predetermined sampling criteria and then interpolated in accordance with predetermined interpolation criteria. Interpolation is a way of estimating values based upon other values. For example, a current dataframe is compared between past dataframes and future dataframes to arrive at reconstructed current dataframe. Different sampling and interpolating techniques well known to those skilled in the art may be used without departing from the spirit and scope of the present invention.

In FIG. 3, a waveform is formed having a predetermined length 306 after the sampling 302 and interpolation 306. For example, in order to reduce latency, the resulting waveform generated from the vocoder frames is one that has a shorter wave-form than the wave-form that was originally used to produce the vocoder frames. As mentioned earlier, pitch-preserving or equivalent frequency-to-time domain transforms are two types of transforms that may be used to produce the shorter wave-form. Then, upon forming a waveform having a predetermined length in 306, the method returns to monitoring the latency in 300 and continues in an iterative manner.

Consider another exemplary scenario where initial media play-out of a VoIP stream has been delayed to the point of introducing an artificial 1000 ms delay into the voice-stream. Also, assume that in this particular VoIP application, media is being bundled as five vocoder frames per datagram. Those skilled in the art will appreciate that other values representing the amount of artificial delay introduced into the voice-stream, as well as different amounts of vocoder frames bundled per datagram may be used without departing from the spirit and scope of the present invention. Rather than submitting each vocoder frame independently to the vocoder, and possibly discarding any eighth-rate frames in the stream to shed latency as described above, all five vocoder frames could be submitted as a group to the vocoder with instructions to produce a waveform that is shorter than the corresponding 100 ms input.

Pitch-preserving transforms exist that allow an arbitrary almost arbitrary time waveform to be generated from the frequency domain information provided by the vocoder frame data itself. Various application layer interfaces may be defined and implemented for vocoders for the purpose of compressing or shedding latency in a real-time VoIP stream.

In one exemplary scenario, pseudo-code for receiving bundled media and submitting each frame individually without any latency shedding for five frames of data is given below:

```
While (listening_to_media) {
    nframes = get_next_bundle (frames, FIVE_FRAMES) ;
    vocoder_play_frame (frames [0]);
    vocoder_play_frame (frames [1]);
    vocoder_play_frame (frames [2]);
    vocoder_play_frame (frames [3]);
```

-continued

```
    vocoder_play_frame (frames [4]);
}
```

However, if the ability to submit one or more frames to the vocoder with instructions to interpolate a waveform shorter than that corresponding to one produced by a sampling rate of 20 ms per frame is available, an exemplary algorithm similar to the following could be realized:

```
while (listening_to_media) {
    nframes = get_next_bundle (frames, FIVE_FRAMES) ;
    length = nframes * TWENTY_MS_PER_FRAME ;
    /* shed latency by playing fast: */
    latency = current_media_latency ( );
    if (latency > MAX_MEDIA_LATENCY) {
        if (latency > TEN_MS)
            length = length − TEN_MS
        else
            length = length − latency;
    }
    vocoder_play_variable (frame, nframes, length) ;
}
```

In this case, a new vocoder interface, vocoder_play_variable ( ), is required. This interface takes one or more vocoder frames and interpolates them into a play-out wave-form having a prescribed length in time. Because the play-out time of these vocoder frames can be shorter than the original sampling time (e.g through the use of a pitch-preserving transform), latency can be shed more gracefully than simply dropping eighth-rate frames. In the exemplary pseudo-code shown above, whenever the real-time experienced media-latency exceeds a prescribed limit, bundles of five vocoder frames are shortened from their original 100 ms sampling period (but to no less than 90 ms) to control media latency.

Other algorithms may utilize other information such as the packet-error rate, received frame statistics, and current media buffer depth. This information can be used singly or in combination. The ability to shed media latency gracefully enhances the operational performance of VoIP applications. As described above, the interfaces and design characteristics provided by the underlying vocoder determine just how graceful latency can be shed. Adding an interface to support variable interpolation of one or more vocoder frames can be used to implement more graceful latency shedding algorithms at the application layer.

In addition to supporting latency shedding, the new interface vocoder_play_variable ( ) can be used to mitigate the occurrence of media under-run events in a VoIP based application. A media under-run event occurs when, as a result of packet-loss, network congestion, or other factors, a vocoder frame is not available at the listener when it is time to play the next vocoder frame. Another way of saying this is that the listener prematurely runs out of vocoder frames to listen to. Under-run events can occur when media latency is high or low; the problems are normally independent of each other.

Generally, VoIP applications artificially introduce a small amount of end-to-end media latency into the playout stream at the listener in order to smooth out jitter in the inter-arrival delays of the received vocoder frames. This small delay is generally desirable, because it can be used to mask the fact that some vocoder frames arrive later than expected.

In practice, it is not desirable to introduce a delay that will hide all variability in the arrival rate of received vocoder frames. In effect, this approach sizes the system for worst case operation. This would introduce unreasonably large initial end-to-end media latencies. Some late arrival events must be tolerated (and the late arriving frames ignored). In the extreme case, the listener's play-out buffer is drained while waiting for new frames to arrive, producing an under-run condition.

These under-runs degrade media quality for at least two basic reasons. First, they introduce an artificial gap in the media play-out waveform. With traditional vocoder interfaces, the vocoder has no choice but to tolerate the under-run and play an erasure frame (or equivalent), while waiting for new media to arrive. Second, if late media does arrive after an under-run, it either must be dropped which further degrades the play-out waveform, or if it is played, an increase in the end-to-end latency must be tolerated. And if the late media never arrives at the listener, but rather the late packets are lost in the network (but later media arrives on schedule), media quality is impacted as a result of frames being lost from the playout stream.

However, the ability to control the length in time of the wave-form produced by one or more vocoder frames on play-out can be used to control the impacts of under-run events on media quality.

Figure 4:
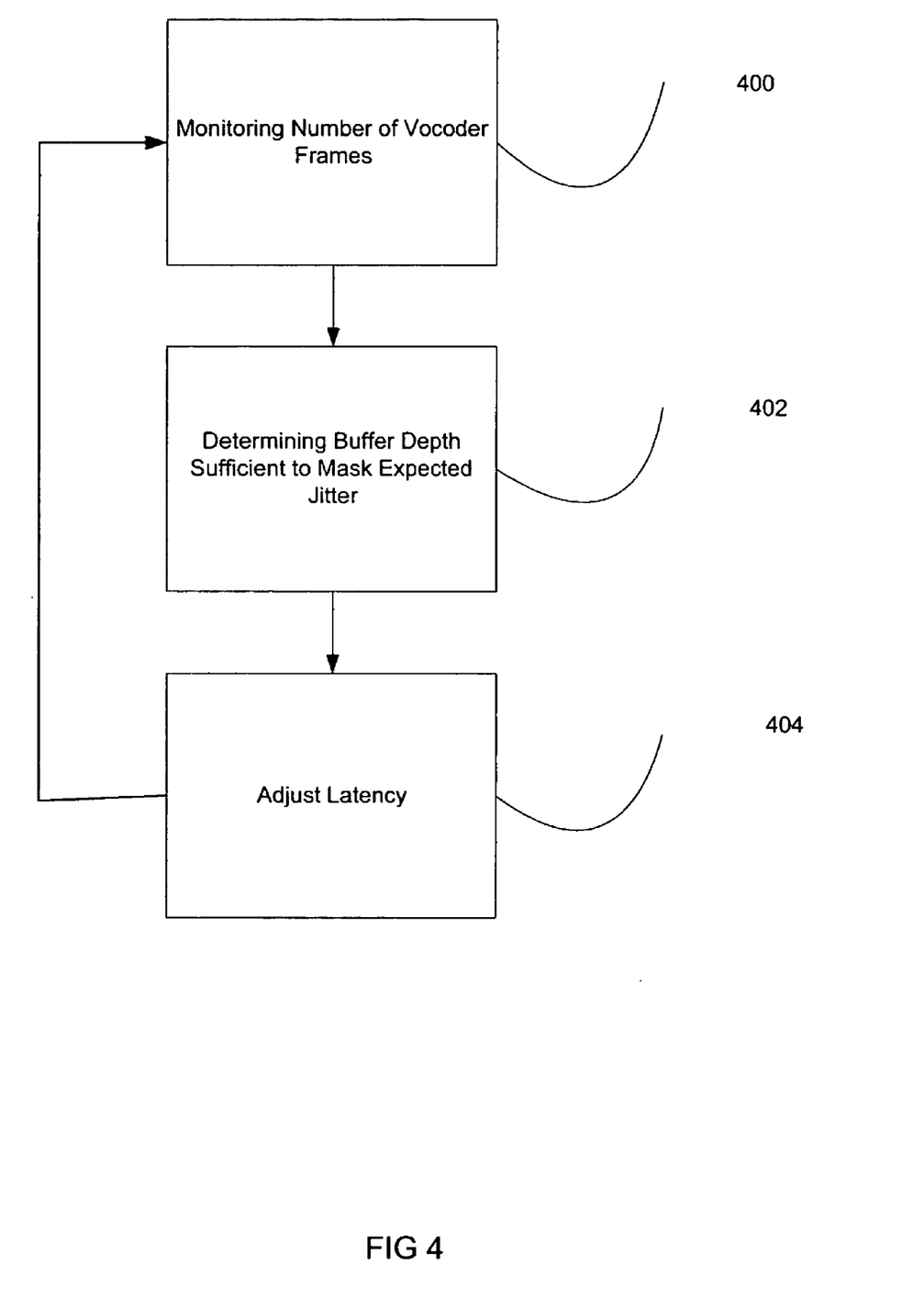
FIG. 4 is a flow chart illustrating the determination of buffer depth that is sufficient to mask expected jitter according to one exemplary embodiment.

FIG. 4 illustrates a flowchart showing an exemplary embodiment of how a buffer depth is determined that is sufficient to mask expected jitter. By monitoring the number of vocoder frames stored in the listener's play-out queue (400 of FIG. 4), the application can determine when the depth of this play-out buffer is too low to mask the expected jitter in the media stream (402 of FIG. 4).

Then, based upon the number of vocoder frames monitored 400 and determining if the buffer depth is sufficient to mask the expected jitter 402, the latency can be adjusted (404 of FIG. 4). This adjustment is performed in accordance with a desired criteria. For example, in one embodiment, the adjustment can be based upon a desired outcome or level of quality. At this point, the application can choose to artificially introduce latency into the play-out wave-form using the available vocoder frames by expanding the length of the wave-form produced. It should be apparent that expanding the length of the waveform will introduce latency into the process. Again, the application of a pitch-preserving transformation is useful in this context. If media latency grows too large, it can be reduced by different methods, such as time-compression. Further, in this case, if delayed media arrives late, rather than being forced to discard it, the information in these vocoder frames can be used to produce a better quality, although shortened wave-form.

The pseudo-code below outlines another exemplary play-out strategy that employs both time-compression and time-expansion to control media latency from growing unreasonably large, while mitigating the effects of lost or delayed frames from the media stream.

```
while (listening _to_media) {
    nframes = get_next_bundle (frames, FIVE_FRAMES) ;
    length = nframes * TWENTY_MS_PER_FRAME;
    /* is playout buffer getting low? */
    depth = current_playout_depth ( ) ;
    if (depth < FIVE_FRAMES)
        length = length + TEN_MS;
    else {
        /* shed latency by playing fast? */
        latency = current_media_latency ( ) ;
        if (latency > MAX_MEDIA_LATENCY) {
            if (latency > TEN_MS)
```

```
            length = length − TEN_MS;
        else
            length = length − latency;
    }
    vocoder_play_variable (frame, nframes, length) ;
}
```

In view of the method being executable on a wireless service provider's computer device or a wireless communications device, the method can be performed by a program resident in a computer readable medium, where the program directs a server or other computer device having a computer to execute the method. The computer readable medium can be the memory of the server, or can be in a connected database. Furthermore, the computer readable medium can be in a secondary storage media that is loadable onto a wireless communications device computer platform, such as a magnetic disk or tape, optical disk, hard disk, flash memory, or other storage media as is known in the art.

Those skilled in the art will appreciate that the method described in this specification and any associated algorithms can be implemented in any form, ranging from code running on a general purpose computer to dedicated circuitry, and any combination in between. In the context of FIGS. 2-4 described in the specification, the method may be implemented, for example, by operating portion(s) of the wireless network (such as the one shown in FIG. 1), such as a wireless communications device or the server (or any other device and combination of devices), to execute a sequence of machine-readable instructions. The instructions can reside in various types of signal-bearing or data storage primary, secondary, tertiary or other levels of storage media. For example, the media may comprise RAM (not shown) accessible by, or residing within, the components of the wireless network. Whether contained in RAM, a diskette, or other, secondary storage media, the instructions may be stored on a variety of machine-readable data storage media, such as a direct access storage device (DASD) [e.g. a conventional hard drive or a redundant array of inexpensive disks (RAID) array], magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission data.

Furthermore, it should be appreciated that any illustrated circuits, logical block diagrams, modules and algorithm steps described in connection with the various disclosed embodiments may be implemented as hardware, software, firmware, or any combinations thereof. To clearly illustrate the interchangeability of hardware, software and firmware, the various circuits, logical block diagrams, modules and algorithm steps are described generally in terms of their functionality. The decision on how the functionality is implemented in hardware, software and firmware depends upon the particular application and the design constraints of the overall system. The described functionality and operation may be implemented in varying ways for each particular application, but such implementation decisions should not be interpreted as departing from the spirit and scope of the present invention.

Those skilled in the art will appreciate that, although illustrative embodiments of the invention have been shown and described, other variations, implementations, and associated algorithms are possible, without departing from the spirit and scope of the invention. The scope of the invention is given by the appended claims, rather than the preceding description. All variations and equivalents which fall within the range of the claims are intended to be embraced therein.

What is claimed is:

1. A method for adaptively managing communication latency comprising:
    monitoring end-to-end media latency in a communication network;
    measuring a current value of end-to-end media latency using data transmitted through the communication network;
    comparing the measured current value of end-to-end media latency against a predetermined media latency value; and
    discarding lower bit-rate data in a media play-out buffer instead of data used to measure the current value of end-to-end media latency, if the measured current value of end-to-end media latency is greater than the predetermined media latency value.

2. The method of claim 1, further comprising:
    determining a current depth in frames of the media play-out buffer; and
    identifying lower bit-rate data for discard periodically in accordance with the determined current depth in frames.

3. The method of claim 2, wherein the media play-out buffer is located at a receiver location within the communication network.

4. The method of claim 1, further comprising:
    evaluating a proportion of targeted frames in a media stream relative to a total number of frames in the media stream; and
    identifying lower bit-rate data for discard periodically in accordance with the evaluated proportion of targeted frames.

5. The method of claim 1, wherein the lower bit-rate data includes eighth-rate vocoder frames.

6. The method of claim 1, wherein the lower bit-rate data is discarded while being prepared for play-out from the media play-out buffer.

7. An apparatus for adaptively managing communication latency comprising:
    means for monitoring end-to-end media latency in a communication network;
    means for measuring a current value of end-to-end media latency using data transmitted through the communication network;
    means for comparing the measured current value of end-to-end media latency against a predetermined media latency value; and
    means for discarding lower bit-rate data in a media play-out buffer instead of data used to measure the current value of end-to-end media latency, if the measured current value of end-to-end media latency is greater than the predetermined media latency value.

8. The apparatus of claim 7, further comprising:
    means for determining a current depth in frames of the media play-out buffer; and
    means for identifying lower bit-rate data for discard periodically in accordance with the determined current depth in frames.

9. The apparatus of claim 8, wherein the media play-out buffer is located at a listener location within the communication network.

10. The apparatus of claim 7, further comprising:
    means for evaluating a proportion of targeted frames in a media stream relative to a total number of frames in the media stream; and means for identifying lower bit-rate data for discard periodically in accordance with the evaluated proportion of targeted frames.

11. The apparatus of claim 7, wherein the lower bit-rate data includes eighth-rate vocoder frames.

12. The apparatus of claim 7, wherein the lower bit-rate data is discarded while being prepared for play-out from the media play-out buffer.

13. A non transitory computer-readable storage medium on which is stored a computer program for embodying a method for adaptively managing communication latency, where the computer program comprises instructions which, when executed by a computer device, comprises:
   monitoring end-to-end media latency in a communication network;
   measuring a current value of end-to-end media latency using data transmitted through the communication network;
   comparing the measured current value of end-to-end media latency against a predetermined media latency value; and
   discarding lower bit-rate data in a media play-out buffer instead of data used to measure the current value of end-to-end media latency, if the measured current value of end-to-end media latency is greater than the predetermined media latency value.

14. The non transitory computer-readable storage medium of claim 13, further comprising:
   determining a current depth in frames of the media play-out buffer; and
   identifying lower bit-rate data for discard periodically in accordance with the determined current depth in frames.

15. The non transitory computer-readable storage medium of claim 14, wherein the media play-out buffer is located at a receiver location within the communication network.

16. The non transitory computer-readable storage medium of claim 13, further comprising:
   evaluating a proportion of targeted frames in a media stream relative to a total number of frames in the media stream; and
   identifying lower bit-rate data for discard periodically in accordance with the evaluated proportion of targeted frames.

17. The non transitory computer-readable storage medium of claim 13, wherein the lower bit-rate data includes eighth-rate vocoder frames.

18. The non transitory computer-readable storage medium of claim 13, wherein the lower bit-rate data is discarded while being prepared for play-out from the media play-out buffer.

* * * * *